United States Patent
Sebastian et al.

(10) Patent No.: US 10,463,074 B2
(45) Date of Patent: *Nov. 5, 2019

(54) PRODUCT AND PACKAGE INCLUDING POWER PRODUCER AND OUTPUT MECHANISM, AND RELATED METHOD

(71) Applicant: R.J. Reynolds Tobacco Company, Winston-Salem, NC (US)

(72) Inventors: Andries Don Sebastian, Clemmons, NC (US); Percy D. Phillips, Pfafftown, NC (US); Pankaj Patel, Clemmons, NC (US); Stephanie Whittington, Kernersville, NC (US); Bruce Alan Bengtsson, Winston-Salem, NC (US); Wesley Steven Jones, Lexington, NC (US); Ercilia Hernandez Garcia, Clayton, NC (US)

(73) Assignee: R.J. Reynolds Tobacco Company, Winston-Salem, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/947,472

(22) Filed: Apr. 6, 2018

(65) Prior Publication Data

US 2018/0220702 A1 Aug. 9, 2018

Related U.S. Application Data

(63) Continuation of application No. 14/814,866, filed on Jul. 31, 2015, now Pat. No. 9,968,129.

(51) Int. Cl.
*A24F 15/18* (2006.01)
*B65B 19/12* (2006.01)
(Continued)

(52) U.S. Cl.
CPC .............. *A24F 15/18* (2013.01); *B65B 19/12* (2013.01); *B65D 77/02* (2013.01);
(Continued)

(58) Field of Classification Search
USPC .................. 206/459.1, 459.5, 242, 271, 273
See application file for complete search history.

(56) References Cited

U.S. PATENT DOCUMENTS 1,910,952 A * 5/1933 Hensmanns ............ A24F 23/04
116/206
3,062,365 A * 11/1962 Fletcher .................. A24F 15/12
206/256
(Continued)

FOREIGN PATENT DOCUMENTS

CN 203079018 7/2013
CN 103354429 10/2013
(Continued)

OTHER PUBLICATIONS

Electric Film Light Harvesting Solutions; © 2014 ElectricFilm, LLC (12 pages). Website visited May 29, 2015 http://electricfilmpower.com/.

(Continued)

*Primary Examiner* — Jacob K Ackun
(74) *Attorney, Agent, or Firm* — Womble Bond Dickinson (US) LLP

(57) ABSTRACT

A product including a package is provided. One or more tobacco-containing articles may be received in the package. A power producer may be configured to produce an electrical current. An output mechanism may be configured to receive the electrical current from the power producer and output a perceptible effect. The perceptible effect may, for example, increase a consumer's interest in the product. A related method is also provided.

18 Claims, 12 Drawing Sheets

(51) Int. Cl.
*B65D 77/02* (2006.01)
*B65D 85/10* (2006.01)
*F21V 23/02* (2006.01)
*G02F 1/163* (2006.01)
*H02N 1/04* (2006.01)
*A24F 47/00* (2006.01)

(52) U.S. Cl.
CPC ..... *B65D 85/1045* (2013.01); *B65D 85/1081* (2013.01); *F21V 23/02* (2013.01); *G02F 1/163* (2013.01); *A24F 47/008* (2013.01); *H02N 1/04* (2013.01)

(56) References Cited

U.S. PATENT DOCUMENTS

| | | | | |
|---|---|---|---|---|
| 4,037,719 | A | * | 7/1977 | Perlmutter ............ A24F 15/005 116/314 |
| 4,620,555 | A | | 11/1986 | Schwarz |
| 4,807,745 | A | | 2/1989 | Langley et al. |
| 4,865,198 | A | * | 9/1989 | Butler ...................... B41M 3/14 206/459.1 |
| 6,896,145 | B2 | | 5/2005 | Higgins et al. |
| 7,000,762 | B2 | * | 2/2006 | Goswami ............... F21V 33/002 206/308.1 |
| 7,119,804 | B2 | | 10/2006 | Sweeney et al. |
| 7,356,952 | B2 | | 4/2008 | Sweeney et al. |
| 7,429,984 | B2 | | 9/2008 | Sweeney |
| 7,617,930 | B2 | | 11/2009 | Jones et al. |
| 7,624,918 | B2 | | 12/2009 | Sweeney et al. |
| 8,118,161 | B2 | | 2/2012 | Guerrera et al. |
| 8,897,628 | B2 | | 11/2014 | Conley et al. |
| 9,968,129 | B2 | * | 5/2018 | Sebastian ................ A24F 15/18 |
| 2006/0011504 | A1 | * | 1/2006 | Gosebruch ............ G06K 17/00 206/459.5 |
| 2009/0266734 | A1 | * | 10/2009 | House ...................... B65D 3/22 206/457 |
| 2011/0277756 | A1 | | 11/2011 | Terry et al. |
| 2011/0308986 | A1 | * | 12/2011 | Lee ...................... B65D 5/0254 206/459.1 |
| 2013/0334293 | A1 | | 12/2013 | Coatney et al. |
| 2014/0338458 | A1 | | 11/2014 | Wang et al. |
| 2015/0128975 | A1 | | 5/2015 | Alarcon |
| 2015/0259132 | A1 | * | 9/2015 | Bernardo ............ B65D 85/1036 206/259 |

FOREIGN PATENT DOCUMENTS

| | | |
|---|---|---|
| CN | 203431696 | 2/2014 |
| CN | 104555052 | 4/2015 |
| CN | 204822648 | 12/2015 |
| CN | 105747274 | 7/2016 |
| DE | 200 12 927 | 3/2001 |
| GB | 2510914 | 8/2014 |
| GB | 2516250 | 1/2015 |
| WO | WO 96/36247 | 11/1996 |
| WO | WO 03/070600 | 8/2003 |
| WO | WO 2010/055312 | 5/2010 |
| WO | WO 2012/100430 | 8/2012 |
| WO | WO 2013/182673 | 12/2013 |
| WO | WO 2014/167309 | 10/2014 |
| WO | WO 2015/022336 | 2/2015 |

OTHER PUBLICATIONS

Products/Opalux Inc.; Photonic Ink; © 2015 Opalux Inc. (5 pages). Website visited May 29, 2015 http://opalux.com/products/.

PragmatIC™ Electronics for a Flexible World (1 pg). Website visited Aug. 20, 2015 http://www.pragmaticprinting.com/index.php.

Kent Displays, What is Reflex® Technology? (5 pgs.) Website visited Aug. 20, 2015. http://www.kentdisplays.com/technology/reflextechnology.php.

* cited by examiner

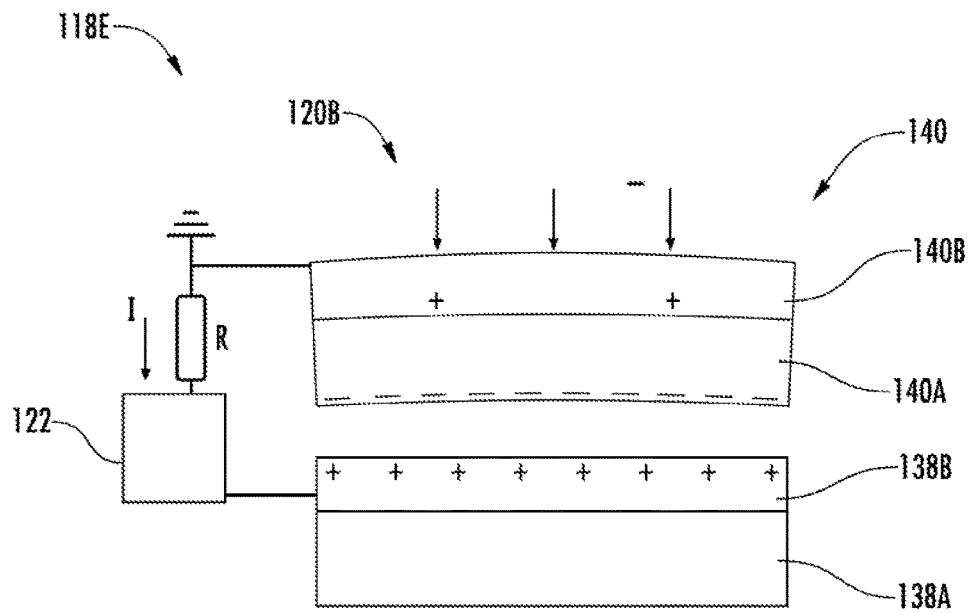

US 10,463,074 B2

PRODUCT AND PACKAGE INCLUDING POWER PRODUCER AND OUTPUT MECHANISM, AND RELATED METHOD

FIELD OF THE DISCLOSURE

The present disclosure relates to products and packages including output mechanisms and power producers, and a related method. The products, packages, and methods may be employed in conjunction with articles made or derived from tobacco, or that otherwise incorporate tobacco.

BACKGROUND OF THE DISCLOSURE

In the packaging industry, packages may be provided with certain features designed and configured to capture a consumer's attention. For example, packages may be shaped or colored in manners that are aesthetically appealing. Thereby, these features may encourage sale of the products including such packaging.

However, in light of increasing competition to gain a consumer's attention, many products may include such pleasing aesthetic attributes, thereby lessening competitive advantages provided thereby. Accordingly, it may be desirable to provide packages with enhanced functionality in order to further appeal to a consumer's interest.

BRIEF SUMMARY OF THE DISCLOSURE

The present disclosure provides packages configured to output a perceptible effect and related systems, methods and products. In one aspect a product is provided. The product may include a package. The package may include a power producer configured to produce an electrical current and an output mechanism configured to receive the electrical current from the power producer and output a perceptible effect. The product may further include one or more tobacco-containing articles received in the package.

In some embodiments the package may additionally include a first body portion defining an opening and a second body portion moveable with respect to the first body portion between a closed configuration in which the first body portion substantially closes the opening and an open configuration. The one or more tobacco-containing articles may be received in the first body portion and accessible via the opening in the open configuration. The output mechanism may be configured to output the perceptible effect in response to movement of the second body portion relative to the first body portion. The power producer may include a plurality of films. Movement between the films may produce the electrical current.

In some embodiments the power producer may include an inductive coil. The output mechanism may include a light emitting diode. The light emitting diode may be included in a rectifier circuit configured to convert the electric current from an alternating current to a direct current. The package may additionally include a communicator electrically coupled to the inductive coil. The communicator may be configured to communicate with an auxiliary electronic device. The package may further include an inner wrapper substantially surrounding the one or more tobacco-containing articles. The inner wrapper may include a paper material.

In some embodiments the output mechanism may be selected from a group consisting of a light emitting diode, an electronic ink, a liquid crystal display, an electroluminescent material, a light emitting electrochemical cell, and an electrochromic display. The package may include a logo, and the output mechanism may be positioned at the logo. The output mechanism may include an electrochromic display. The electrochromic display may be configured to change color or shade in a pattern.

In an additional aspect a method for assembling a product is provided. The method may include providing a package. The package may include a power producer configured to produce an electrical current and an output mechanism configured to receive the electrical current from the power producer and output a perceptible effect. The method may additionally include inserting one or more tobacco-containing articles into the package.

In some embodiments providing the package may include providing a first body portion defining an opening and a second body portion moveable with respect to the first body portion between a closed configuration in which the first body portion substantially closes the opening and an open configuration. Inserting one or more tobacco-containing articles into the package may include inserting the one or more tobacco-containing articles into the first body portion.

In some embodiments the power producer may include an inductive coil. The output mechanism may include a light emitting diode. The light emitting diode may be included in a rectifier circuit configured to convert the electric current from an alternating current to a direct current. Providing the package may include electrically coupling a communicator to the inductive coil. The communicator may be configured to communicate with an auxiliary electronic device. Further, the method may include wrapping the one or more tobacco-containing articles with an inner wrapper. The inner wrapper may include a paper material.

In some embodiments the power producer may include a plurality of films. Movement between the films may produce the electrical current. The output mechanism may include a light emitting diode, an electronic ink, a liquid crystal display, or an electrochromic display. The package may include a logo and the output mechanism may be positioned at the logo.

These and other features, aspects, and advantages of the disclosure will be apparent from a reading of the following detailed description together with the accompanying drawings, which are briefly described below.

BRIEF DESCRIPTION OF THE DRAWINGS

Figure 1:
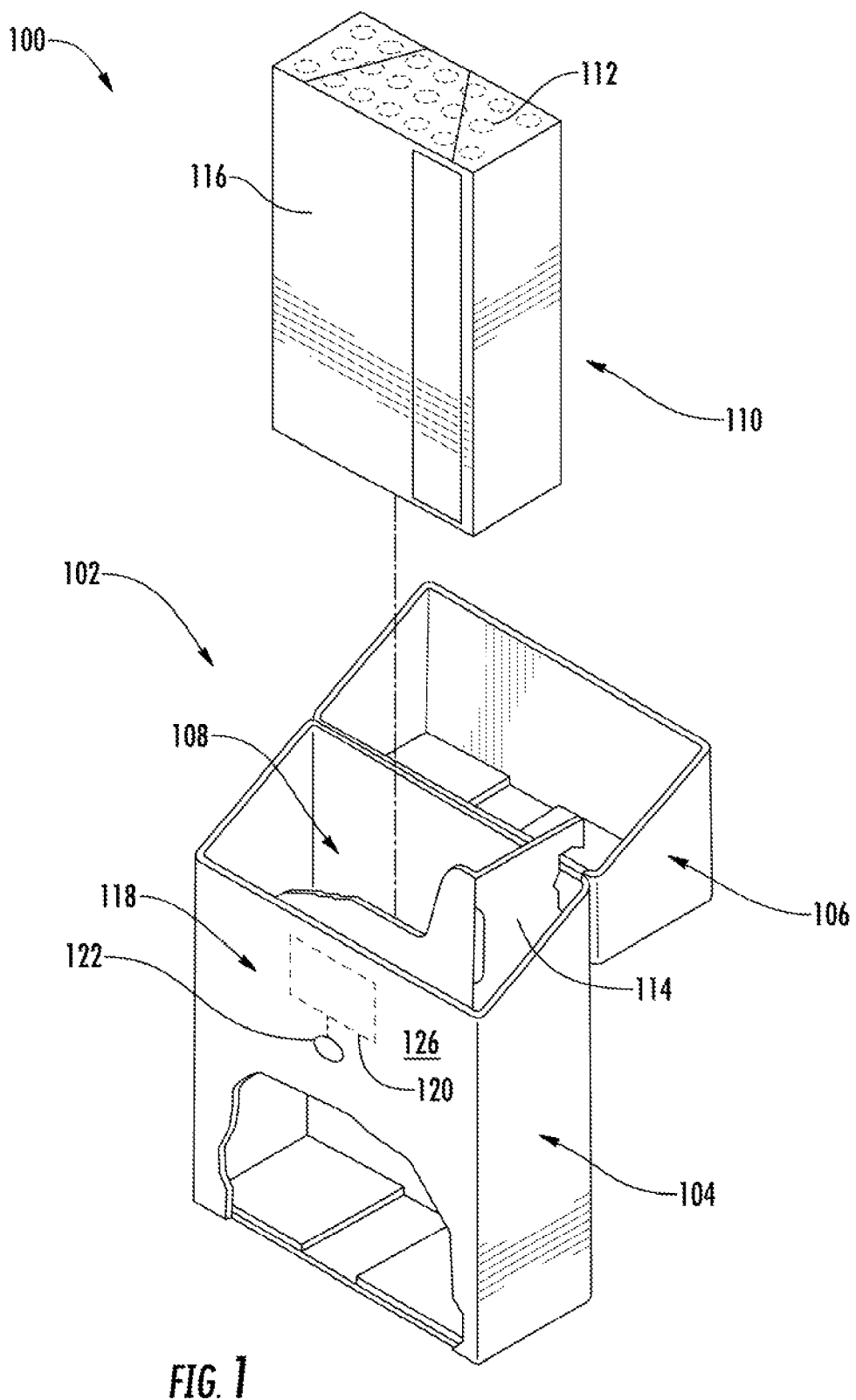
Figure 2A:
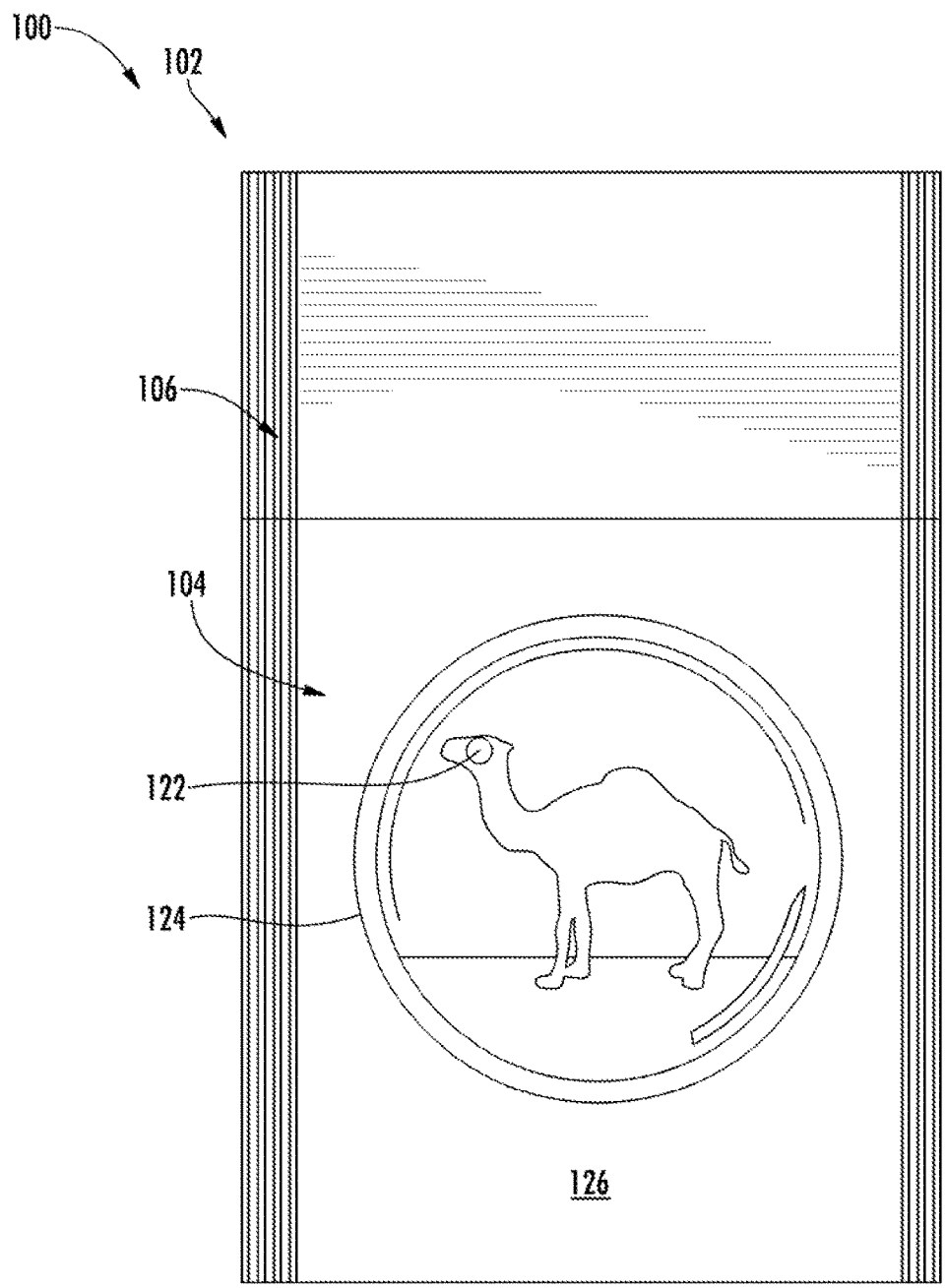
Figure 2B:
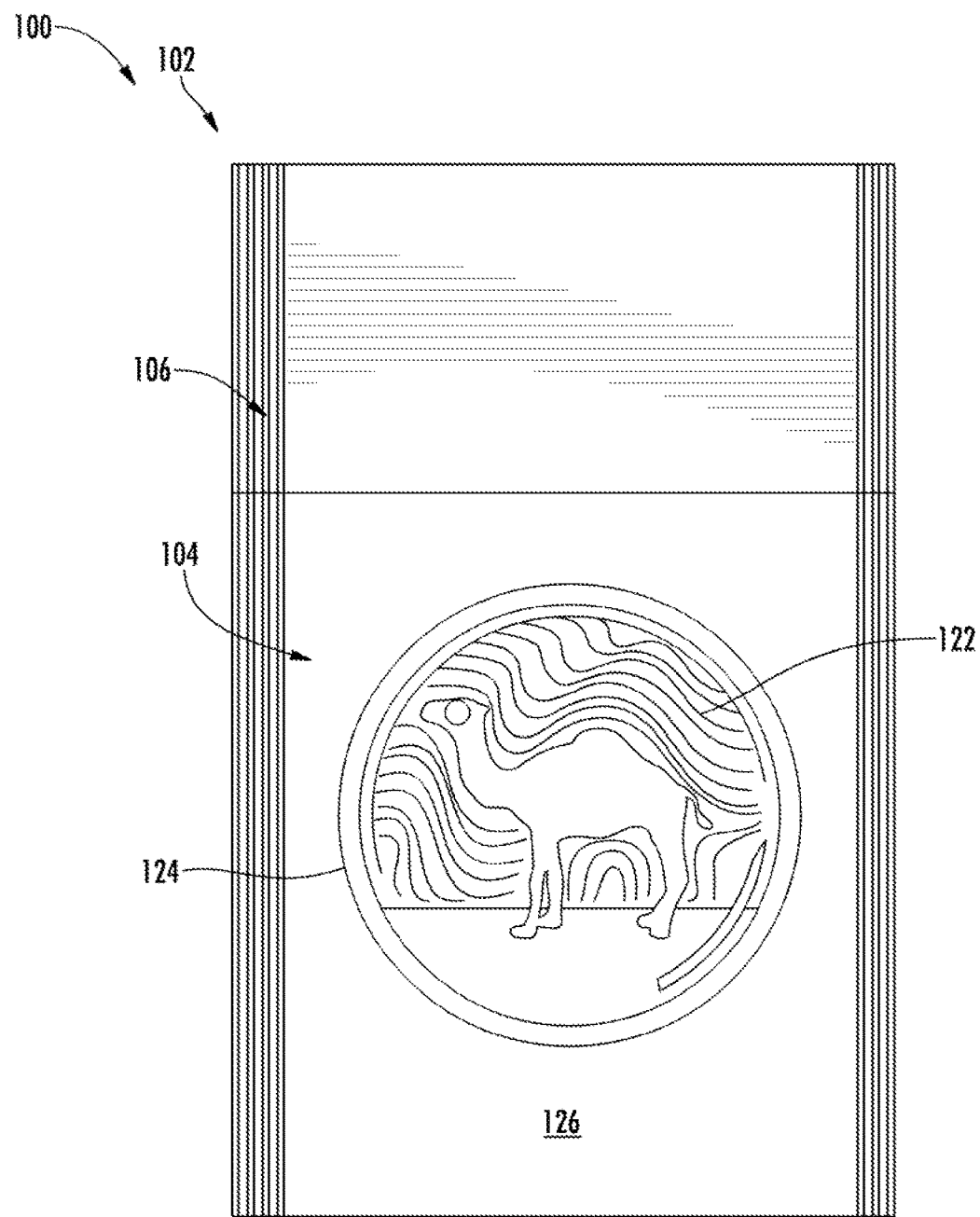
Figure 3:
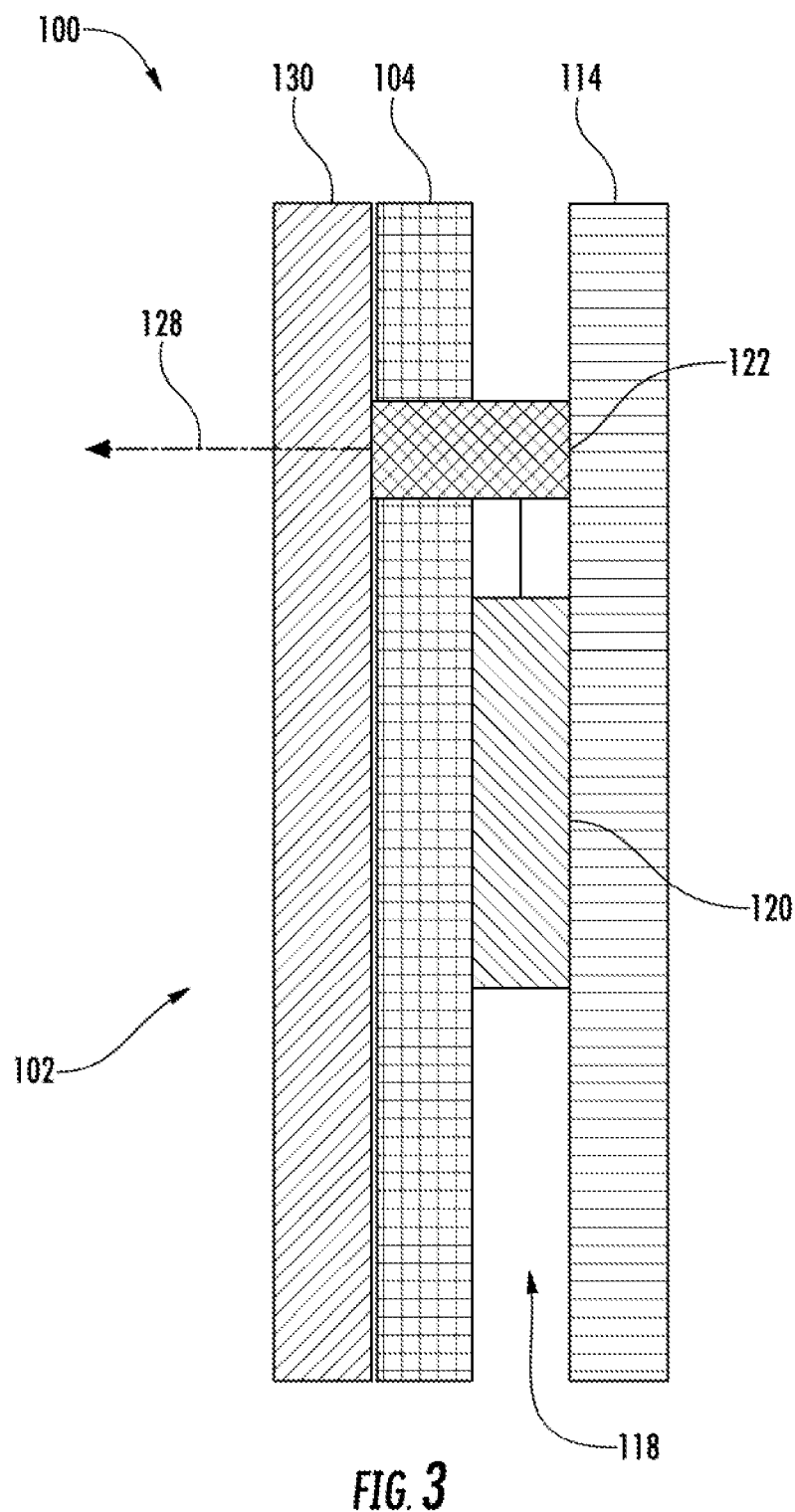
Figure 4:
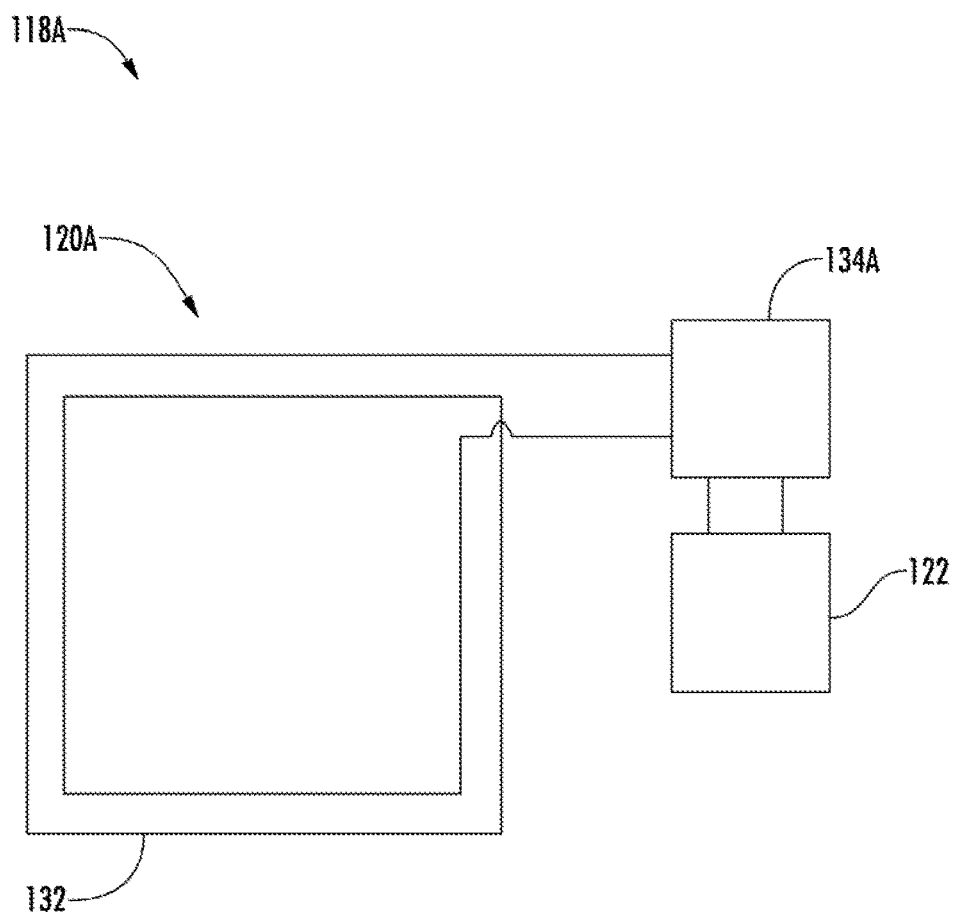
Figure 5:
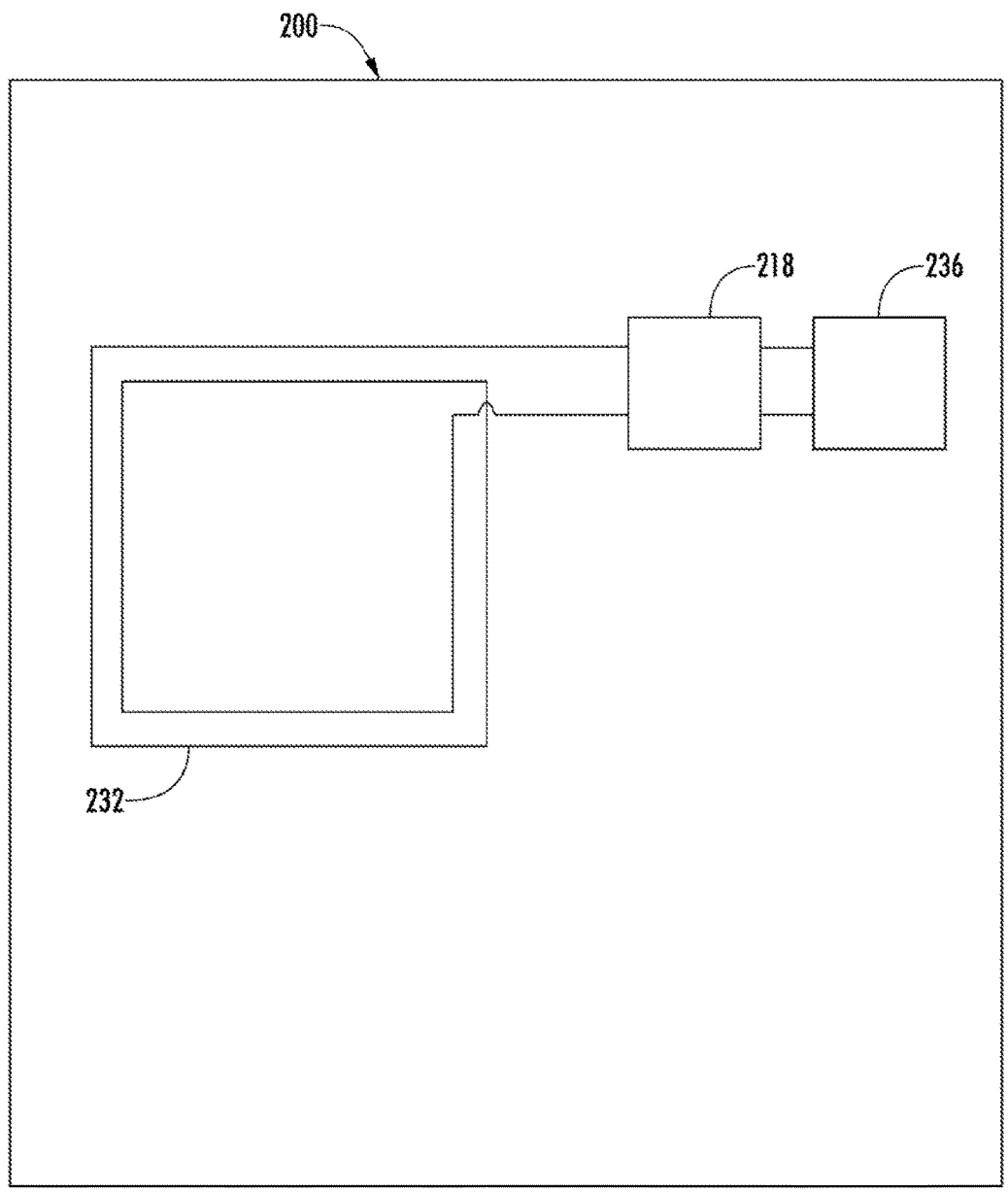
Figure 6:
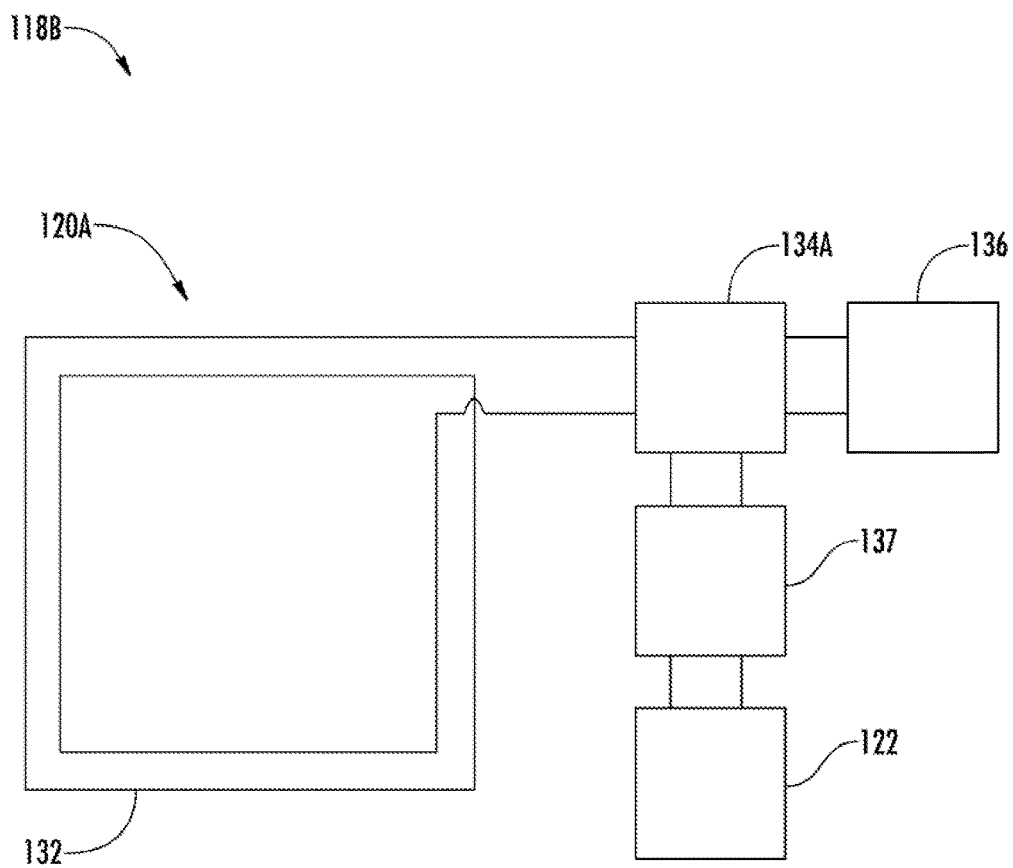
Figure 7:
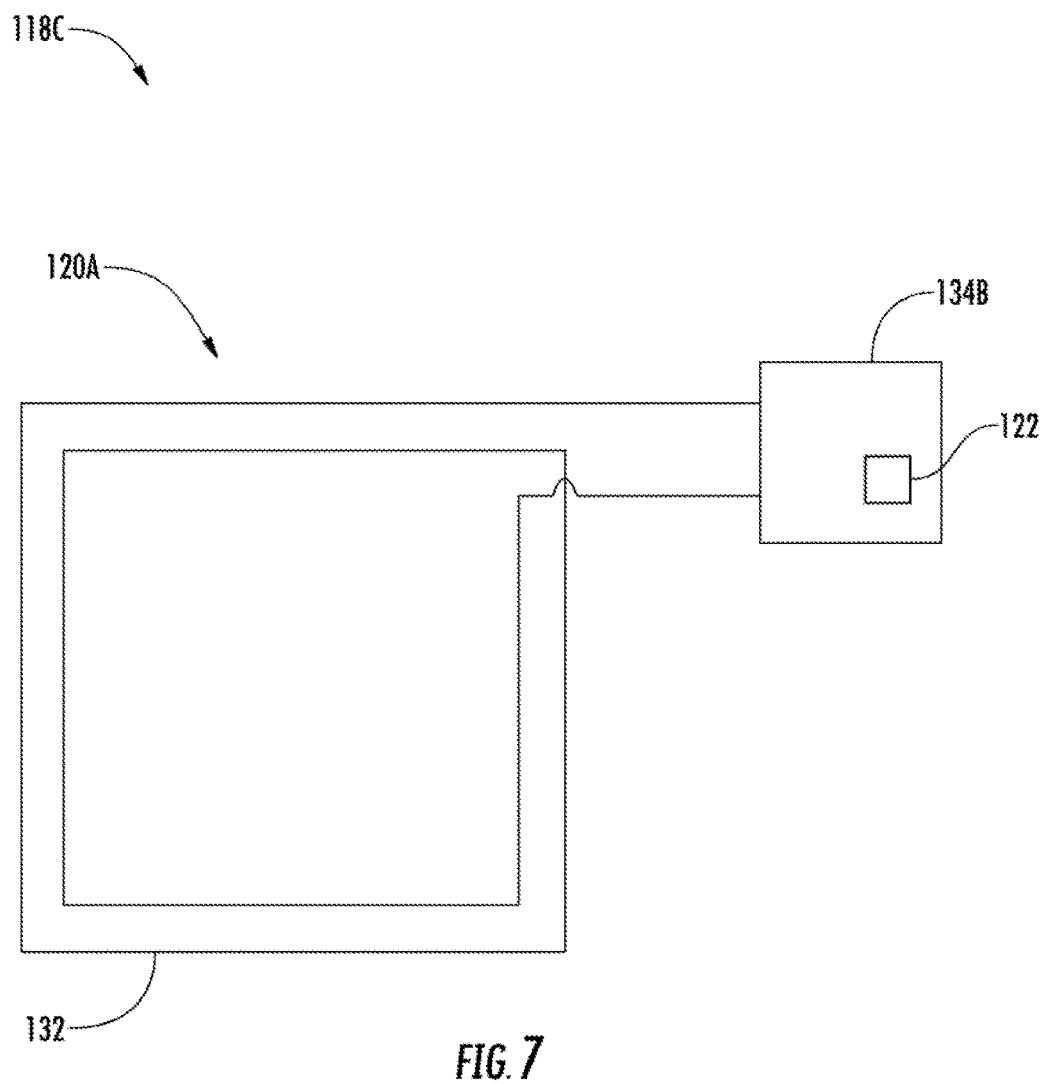
Figure 8:
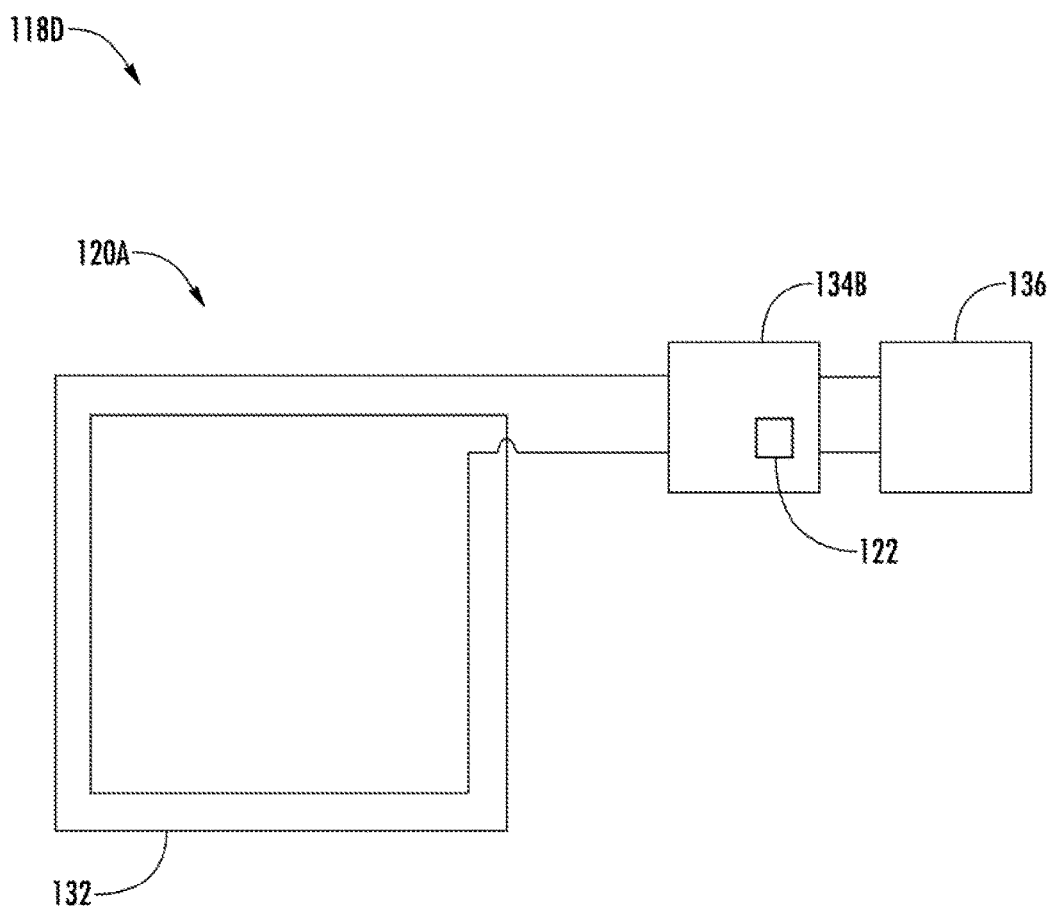
Figure 9:
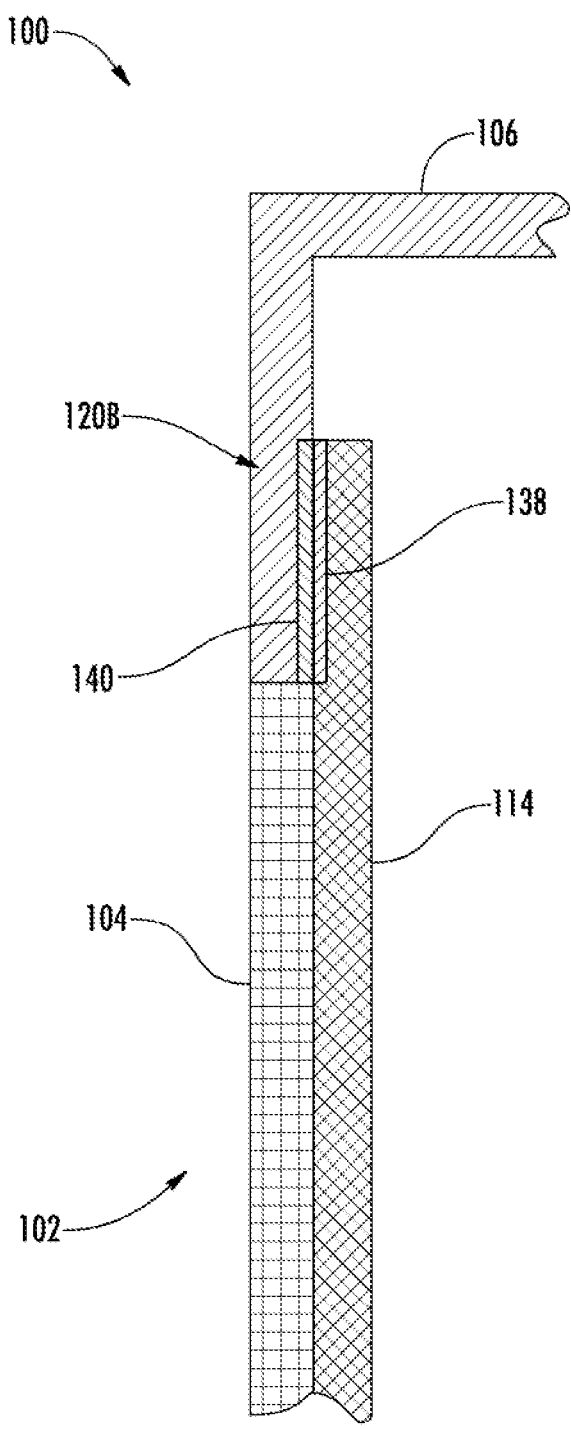
Figure 10C:
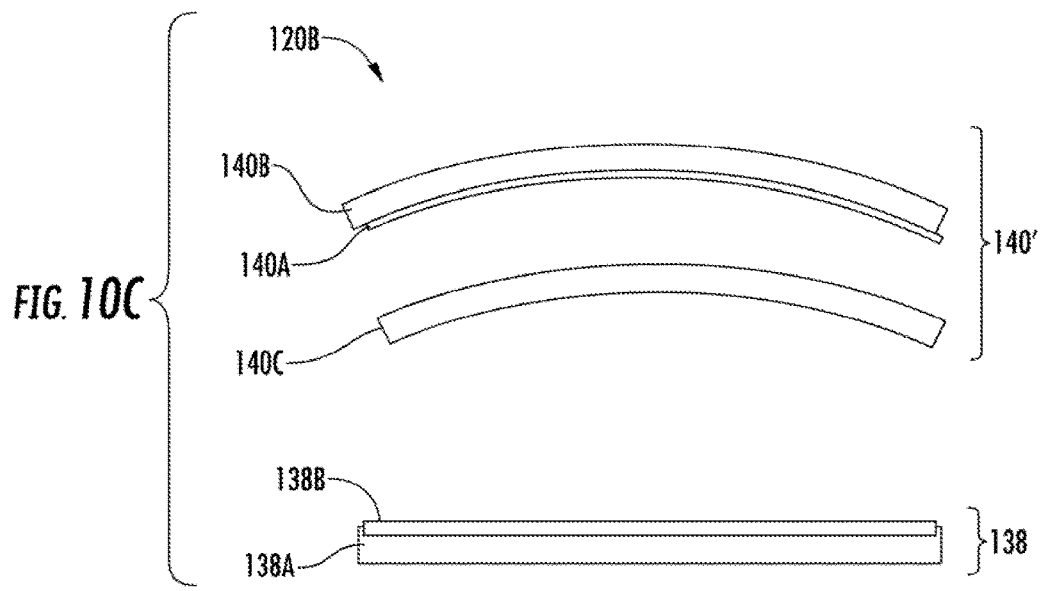
Figure 11:
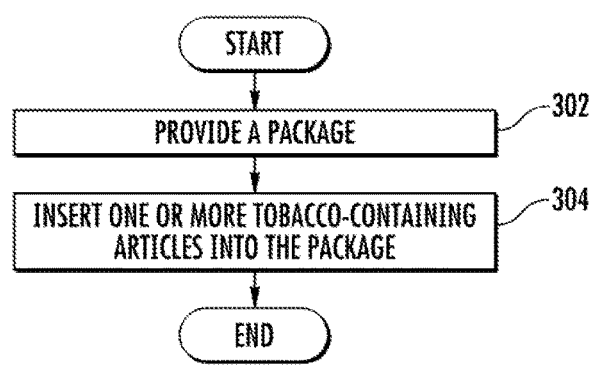

Having thus described the disclosure in general terms, reference will now be made to the accompanying drawings, which are not necessarily drawn to scale, and wherein:

FIG. 1 illustrates an exploded view of a product including a package and one or more articles, the package including a control circuit comprising a power supply and an output mechanism according to an example embodiment of the present disclosure;

FIG. 2A illustrates a front view of the product of FIG. 1 wherein the output mechanism is positioned at an eye of a logo according to an example embodiment of the present disclosure;

FIG. 2B illustrates a front view of the product of FIG. 1 wherein the output mechanism is positioned at a background of a logo according to an example embodiment of the present disclosure;

FIG. 3 schematically illustrates a sectional view through the product of FIG. 1, wherein the output mechanism is configured to output a visible perceptible effect according to an example embodiment of the present disclosure;

FIG. 4 schematically illustrates the control circuit of FIG. 1 including an inductive coil, the output mechanism, and a rectifier circuit according to an example embodiment of the present disclosure;

FIG. 5 illustrates an auxiliary electronic device according to an example embodiment of the present disclosure;

FIG. 6 illustrates the control circuit of FIG. 4 further comprising a communicator and a controller according to an example embodiment of the present disclosure;

FIG. 7 schematically illustrates the control circuit of FIG. 1 including an inductive coil, the output mechanism, and a rectifier circuit, wherein the output mechanism is included in the rectifier circuit according to an example embodiment of the present disclosure;

FIG. 8 illustrates the control circuit of FIG. 7 further comprising a communicator according to an example embodiment of the present disclosure;

FIG. 9 schematically illustrates a sectional view through the product of FIG. 1 wherein the power supply comprises a plurality of films according to an example embodiment of the present disclosure;

FIG. 10A schematically illustrates a control circuit including the plurality of films of FIG. 9 when the films are being brought into contact according to an example embodiment of the present disclosure;

FIG. 10B schematically illustrates the control circuit of FIG. 10A when the films are being separated according to an example embodiment of the present disclosure;

FIG. 10C schematically illustrates the films of FIG. 9 wherein the films further include a charged layer according to an example embodiment of the present disclosure; and FIG. 11 schematically illustrates a method for assembling a product according to an example embodiment of the present disclosure.

DETAILED DESCRIPTION OF THE DISCLOSURE

The present disclosure now will be described more fully hereinafter with reference to certain preferred aspects. These aspects are provided so that this disclosure will be thorough and complete, and will fully convey the scope of the disclosure to those skilled in the art. Indeed, the disclosure may be embodied in many different forms and should not be construed as limited to the aspects set forth herein; rather, these aspects are provided so that this disclosure will satisfy applicable legal requirements. As used in the specification, and in the appended claims, the singular forms "a", "an", "the", include plural referents unless the context clearly dictates otherwise.

Various products are sold in retail establishments. Such stores often carry a wide variety of types and brands of products. Thereby, product packaging may play an important role in dictating sales of the products associated therewith.

In this regard, by way of example, U.S. patent application Ser. No. 14/274,245, filed May 9, 2014, and Ser. No. 14/700,636, filed Apr. 30, 2015, both to Stebbins et al. and each incorporated herein by reference in their entireties, disclose convertible packaging devices which may be employed to house one or more products during shipment, and display the products at a retail store upon conversion of the devices to a display configuration at the retail store. Further, U.S. Pat. No. 9,072,320 to Coatney et al. discloses promotional packaging configured to hold first and second tobacco products, which may differ from one another, in first and second compartments, and is incorporated herein by reference in its entirety.

However, various other mechanisms and methods for packaging products may be desirable. In this regard, FIG. 1 illustrates an exploded, partial cutaway view of a product 100 according to an example embodiment of the present disclosure. As illustrated, the product 100 may include a package 102. The package 102 may include a first body portion 104 and a second body portion 106. The first body portion 104 may define an opening 108. The second body portion 106 may be moveable with respect to the first body portion 104 between a closed configuration in which the first body portion substantially closes the opening 108 and an open configuration. The open configuration of the package 102 is illustrated in FIG. 1. The closed configuration of the package 102 is illustrated in FIGS. 2A and 2B.

As further illustrated in FIG. 1, the first body portion 104 may be configured to receive one or more articles 110. The articles 110 may be accessible from the first body portion 104 via the opening 108 in the open configuration. Conversely, the articles 110 may be substantially inaccessible when the package 102 is in the closed configuration.

In one embodiment the first body portion 104 may be configured to receive one or more tobacco-containing articles. For example, in the illustrated embodiment the articles 110 comprise cigarettes 112. In this regard, the package 102 may comprise a cigarette hard pack. The package 102 may include an inner frame 114 that provides the package 102 with additional support. Further, the cigarettes 112 may be received within an inner wrapper 116, which may be substantially air-tight in order to maintain freshness of the cigarettes. Additional description regarding example embodiments of packages for cigarettes is provided in U.S. patent application Ser. No. 14/205,818 to Wood et al., filed Mar. 12, 2014, which is incorporated herein by reference in its entirety.

The package 102 may be formed from various materials. In some embodiments all or a portion of the package 102 (e.g., the first body portion 104, the second body portion 106, and/or the inner frame 114 may be formed from a paper material (e.g., paper or paperboard). However, as may be understood, various other materials may be employed in other embodiments.

However, as may be understood, the apparatuses and methods disclosed herein are equally applicable to other embodiments of the package configured to receive other embodiments of articles, such as other embodiments of packages configured to receive tobacco-containing articles. For example, the tobacco-containing articles may include a so-called electronic cigarette (i.e., an "e-cigarette" or "e-cig"), a control body or cartridge for an electronic cigarette, or a smokeless tobacco product such as snus or snuff. Further, as may be understood, the particular shape of the package 102 may be configured based on the articles received therein (e.g., as a tin, puck, container, box, bubble package, etc., depending on the articles received therein). Accordingly, it should be understood that the product 100 illustrated in FIG. 1 is provided for example purposes only.

The package 102 may further include a control circuit 118. The control circuit 118 may include one or more components configured to perform various functions as described hereinafter. In one embodiment the control circuit 118 may include a power supply 120 configured to produce an electrical current. Various embodiments of the power supply 120 are described hereinafter.

Additionally, the control circuit 118 may include an output mechanism 122. The output mechanism 122 may be configured to receive the electrical current from the power supply 120 and output a perceptible effect. Various embodiments of the output mechanism 122 may be included in the control circuit 118. For example, the output mechanism 122 may include a light emitter configured to output light, a sound emitter configured to output sound, a display configured to output graphics and/or text, a scent emitter configured to output a smell, and an actuator configured to output motion. In a preferred embodiment the output mechanism 122 may be selected from a group consisting of a light emitting diode, an electronic ink, a liquid crystal display, an electroluminescent material (EL), a light emitting electrochemical cell (LEC), and an electrochromic display.

In embodiments of the output mechanism 122 comprising a light emitter the output mechanism may comprise a light emitting diode (LED), or multiple LEDs. In this regard, LEDs may define a relatively high light output to power usage ratio. Further, LEDs may define relatively small sizes such that the LED may be relatively easily received in in the product 100. In some embodiments the LEDs may comprise an organic LED (OLED) such as a polymer OLED (P-OLED). However, in other embodiments of the output mechanism 122 the light emitter may comprise an incandescent bulb, a compact fluorescent light (CFL), a halogen bulb, or any other embodiment of light emitter.

In other embodiments in which the output mechanism 122 comprises a display, the output mechanism may comprise a liquid-crystal display (LCD), a cathode ray tube display (CRT), a light emitting diode display, an electroluminescent display (ELD), electronic paper, electronic ink or photonic ink (e.g., electronic ink configured to display two or more colors), a plasma display panel (PDP), a liquid crystal display (LCD), a high-performance addressing display (HPA), a thin-film transistor display (TFT), an organic light-emitting diode display (OLED), a surface-conduction electron-emitter display (SED), a laser television, a carbon nanotube display, a quantum dot display, or an interferometric modulator display (IMOD), or similar materials and constructs or combinations thereof. Regardless of the particular embodiment of the display employed, the display may output one or more of a graphic, a text, a character, an animation, and a video. Video and animation may be employed to attract consumer attention due to the perceived motion associated therewith. Further, the display may be configured to output a single color, or multiple colors. As may be understood, outputting multiple colors may further attract consumer attention.

Example embodiments of flexible bi-stable two color LCDs are available from Kent Displays of Kent, Ohio. Example embodiments of electrochromic displays are available from Ynvisible of Cartaxo, Portugal. Example embodiments of electronic ink are available from Opalux, Inc. of Toronto, Canada. One embodiment of electronic ink referred to as active ink may employ photonic crystals made out of silica beads embedded in a resilient electroactive polymer and sandwiched between transparent electrodes. When a voltage is applied, an electrolyte fluid is drawn into the polymer composite, causing the polymer composite to swell, which alters the spacing of the photonic crystals, affecting which wavelengths of light the photonic crystals reflect. Thereby, the reflected light may form graphics and/or text in one or more colors.

Embodiments of the output mechanism 122 comprising sound emitters may include one or more speakers (e.g., electroacoustic transducers), buzzers, electric bells, chimes, etc. Thereby, the audible output may include one or more of music, speech, buzzing, ringing, etc. In some embodiments of the output mechanism 122 the sound emitter may output information regarding the product 100.

Embodiments of the output mechanism 122 comprising scent emitters may be configured to output a scent via one of various mechanisms. For example, the scent emitter may be configured to release a pressurized scented fluid to the surrounding atmosphere via an electromechanical valve. By way of further example, a fan may blow air through or past a scented medium to deliver a scent to the surrounding atmosphere. In another embodiment the scent emitter may comprise a heater (e.g., a resistance heater) configured to heat a scented medium to vaporize or otherwise release the scent to the surrounding atmosphere. In one embodiment the scent may be configured to mimic a scent of the one or more articles 110. In this regard, the package 102 may be substantially sealed or may otherwise prevent the scent associated with the one or more articles 110 from entering the surrounding atmosphere. Thereby, the output mechanism 122 may instead output the scent of the articles 110 (e.g., tobacco), to provide consumers with a sense of the smell or flavor (e.g., menthol or vanilla) associated therewith.

Embodiments of the output mechanism 122 comprising actuators configured to output motion may include solenoids, electric motors (e.g., rotary or linear), and vibratory mechanisms (e.g., comprising a rotary motor and an eccentric mass). Accordingly, the actuator may cause physical motion of the product 100 as a whole or a portion thereof. Physical motion may be employed for the same reason animation and video may be employed in a display, as described above. In this regard, motion may be readily noticed and perceived by a consumer.

In the illustrated embodiment the control circuit 118 is coupled to the first body portion 104. However, in other embodiments the control circuit 118 may be coupled to the second body portion 106. Alternatively, part of the control circuit 118 (e.g., the power supply 120 or the output mechanism 122) may be coupled to the first body portion 104 whereas another part of the control circuit (e.g., the other of the power supply and the output mechanism) may be coupled to the second body portion 106. In other embodiments all or a portion of the control circuit may be coupled to one or more other parts of the package 102 (e.g., the inner frame 114).

In some embodiments some, or all, of the various circuits disclosed herein may be partially or fully printed on one or more portions of the package 102 such as the first body portion 104, the second body portion 106, and/or the inner frame 114. Further, as noted above, in some embodiments one or more portions of the package 102 may comprise a paper material. The paper material may include a coating of nanocellulose to make it substantially smooth. Thereby, printing of a circuit thereon may be facilitated.

As illustrated in FIGS. 2A and 2B, in one embodiment the package 102 may comprise a logo 124. The logo 124 may be printed on one or both of the first body portion 104 and the second body portion 106. In the embodiment illustrated in FIGS. 2A and 2B, the logo 124 is printed on an outer front surface 126 of the first body portion 104. As noted above, in some embodiments the package 102 may include the output mechanism 122. In this regard, in some embodiments the output mechanism 122 may be positioned at the logo 124. More particularly, the output mechanism 122 may be integrated into the design of the logo 124.

For example, as illustrated in FIG. 2A, the output mechanism 122 may be positioned at an eye portion of the logo 124. Thereby, in embodiments in which the output mechanism 122 is configured to output light, the logo 124 may appear to wink or glow. In this embodiment the output mechanism 122 may comprise, by way of example, an incandescent bulb, a halogen bulb, or a light emitting diode.

In another embodiment, as illustrated in FIG. 2B, the output mechanism 122 may be positioned at a background portion of the logo 124. Further, the output mechanism 122 may be configured to change color or shade or produce any other visible perceptible effect. In one embodiment the output mechanism 122 may change color or shade across the entire display surface thereof. However, in another embodiment, as illustrated in FIG. 2B, the output mechanism 122 may be configured to change color or shade across only a portion of the display area defined by the output mechanism 122 at the exterior of the package 102. For example, the output mechanism 122 may change color or shade in a pattern (e.g., a series of separated lines or segments), as illustrated in FIG. 2B. Output of a visible perceptible effect in a pattern may be more pronounced, with improved contrast, which may be more easily perceived by a consumer. Further, in embodiments in which the output mechanism 122 comprises an electrochromic display, output of a pattern, rather than a uniform change across the entirety of the display area thereof, may occur relatively more rapidly. In this regard, switching times may be relatively slow for electrochromic displays.

Accordingly, the output mechanism 122 may output a perceptible effect to draw a consumer's attention to the package 102 and the product 100 as a whole. Further, in embodiments in which the output mechanism 122 is positioned at the logo 124, the output mechanism may additionally specifically draw a consumer's attention to the logo.

Regardless of the type of output mechanism 122 employed and whether or not the output mechanism is positioned at the logo 124, the output mechanism may be coupled to (e.g., embedded in or positioned inside) the package 102. More generally, some or all of the control circuit 118 may be coupled to (e.g., embedded in or positioned inside) the package 102. In this regard, FIG. 3 schematically illustrates a partial sectional view through the package 102. As illustrated, in one embodiment some or all the control circuit 118 may be received between the first body portion 104 and the inner frame 114. Thereby, for example, the power supply 120 and/or the output mechanism 122 may be substantially or totally hidden from view.

However, as described herein and illustrated in FIG. 3, in some embodiments the output mechanism 122 may be configured to output a visible perceptible effect 128. In embodiments in which the output mechanism 122 outputs the visible perceptible effect 128, the output mechanism may be positioned such that at least a portion of the output mechanism 122 extends to an outer surface of the package 102. For example, the output mechanism 122 may extend to the outer front surface 126 of the first body portion 104, as illustrated in FIGS. 2A and 2B. Thereby the perceptible effect 128 may be visible to consumers.

As further illustrated in FIG. 3, in some embodiments the package 102 may additionally include an outer wrapper 130, which may surround the first body portion 104 and the second body portion 106. However, the outer wrapper 130 may be translucent or transparent such that the perceptible effect 128 is visible therethrough. For example, in some embodiments the outer wrapper may comprise a plastic film (e.g., oriented polypropylene). Alternatively, the perceptible effect 128 may be visible after removal of the outer wrapper 130.

Various embodiments of the power supply 120 may be employed to supply power to the output mechanism 122. As a result of the product 100 being preferably configured as portable, it may be desirable to configure the product such that a wired connection to an external power supply (e.g., an alternative current wall outlet) is not required. Thus, for example, in one embodiment the power supply may comprise a battery. The battery may be replaceable, rechargeable, or configured to last a lifetime of the product 100. However, batteries may be relatively bulky, particularly in terms of a minimum thickness, which may require an undesirable redesign of the size or shape of the package to accommodate the battery. Similarly, capacitors may suffer from similar sizing challenges. Further, inclusion of specialized circuits configured to control the output of current from the capacitor may be required, which may be cost prohibitive.

Accordingly, usage of other embodiments of the power supply 120 to provide electrical current to the output mechanism 122 may be desirable. Thus, as described hereinafter, the power supply 120 may comprise a power producer. A power producer, as used herein, refers to an embodiment of the power supply 120 configured to produce, as opposed to store or transmit, an electrical current. Thus, batteries, capacitors, and other current storage mechanisms are not by themselves considered to be power producers within the meaning of a power producer as this term is used herein. Note, however, that in some embodiments the control circuit may include a battery, a capacitor, or other current storage mechanism in combination with a power producer. Thereby, the current stored by the battery, capacitor, or other current storage mechanism may be selectively outputted to the output mechanism when desired. Further, it should be understood that wired connections that transmit current therethrough to the product from an external power supply (e.g., a wall outlet or an adapter connected thereto) do not fall within the definition of a power producer, as used herein.

In each of the embodiments of the power supply 120 described below the power supply comprises a power producer. Various embodiments of the power producer may be employed. In one embodiment the power producer may be configured to employ energy harvesting to produce electrical current. In this embodiment the power supply 120 may be configured to receive and convert ambient energy into electrical current. The ambient energy may come from electric or magnetic fields or radio waves from nearby electrical equipment, light, thermal energy (e.g., heat), or kinetic energy such as vibration or motion. An example of a device configured to perform ambient energy harvesting is the smart current sensor chip developed by Dr. Or of Hong Kong Polytechnic University. Energy harvesting is also described in U.S. Pat. No. 8,897,628 to Conley et al., the disclosure of which is incorporated herein by reference in its entirety.

In another embodiment the power supply 120 may comprise a light-to-power conversion mechanism. The light-to-power conversion mechanism may be configured to receive light from a light source and output electrical current. Thus, the light-to-power conversion mechanism may comprise a photovoltaic cell. Various embodiments of light-to-power conversion mechanisms are described in U.S. patent application Ser. No. 14/725,725, filed May 29, 2015, to Rogers, which is incorporated herein by reference in its entirety.

However, additional components may be required for usage of the light-to-power conversion mechanism in the product. For example, a current storage mechanism (e.g., a battery or a capacitor) may be required to store and accumulate current produced by the light-to-power conversion mechanism until sufficient current is available to activate the output mechanism. Further, a switch may be required to release the current from the energy storage device and activate the output mechanism.

Additionally, the product 100 may spend a relatively large portion of time indoors prior to sale and when in the possession of the consumer after sale. Ambient light in indoor locations may be of relatively low intensity, and the area of the light-to-power conversion mechanism may be relatively small, particularly when included in products such as cigarette packs that are configured to be handheld. Thus, the amount of power produced by a light-to-power conversion mechanism may be relatively low. Thereby, the amount of time during which there is sufficient current for the output mechanism 122 to output a perceptible effect in any given time period may be undesirably short.

Accordingly, usage of other embodiments of power producers may be desirable. For example, FIG. 4 illustrates an example embodiment of the control circuit 118A wherein the power supply 120A comprises an inductive coil 132. The inductive coil 132 may be configured to produce electrical current that powers the output mechanism 122. As further illustrated in FIG. 4, the control circuit 118 may additionally include a rectifier circuit 134A. The rectifier circuit 134A may be configured to convert the electric current produced by the inductive coil from an alternating current to a direct current.

In some embodiments the product 100 may be configured to operate in conjunction with an auxiliary electronic device. In this regard, FIG. 5 illustrates an auxiliary electronic device 200 according to an example embodiment of the present disclosure. The auxiliary electronic device 200 may comprise a smartphone, a cellphone, or a personal digital assistant, or define any of various other form factors and/or be configured to perform various other functions. Regardless of the particular embodiment selected, the auxiliary electronic device 200 may include a power supply 218 and an inductive coil 232. The power supply 218 may be configured to supply power to the inductive coil 232 to produce a magnetic field that the inductive coil 132 of the power supply 120 of the product 100 employs to produce the electrical current.

In particular, the inductive coil 132 of the product 100 and the inductive coil 232 of the auxiliary electronic device 200 may be placed in proximity to form an electrical transformer by, for example, bringing the product and the auxiliary electronic device 200 into close proximity. A change in current in the inductive coil 232 of the auxiliary electronic device 200, as provided by the power supply 218 thereof, produces an alternating electromagnetic field that induces a voltage across the ends of the inductive coil 132 of the product 100. The induced voltage at the inductive coil 132 of the product 100 may be provided as an alternating current. Thereby, the rectifier circuit 134A of the product 100 may convert the electrical current to direct current. The direct current outputted from the rectifier circuit 134A may thereby power the output mechanism 122. In some embodiments resonant inductive coupling may be employed to improve the allowed range between the auxiliary inductive coil 232 of the auxiliary electronic device 200 and the inductive coil 132 of the product 100. Note that the auxiliary electronic device 200 may operate in conjunction with any of the embodiments of the product 100 described herein including the inductive coil 132, and hence the operation thereof will not be described again hereinafter.

FIG. 6 illustrates an embodiment of the control circuit 118B further comprising a communicator 136. The communicator 136 may be electrically coupled to the inductive coil 132. For example, as illustrated in FIG. 6, the communicator 136 may be configured to receive electrical current from the rectifier circuit 134A, which receives electrical current from the inductive coil 132 as noted above.

The communicator 136 may be configured to transmit a signal to an auxiliary electronic device and/or receive a signal from an auxiliary electronic device. For example, the communicator 136 may be configured to transmit a signal to, or receive a signal from, the above-described auxiliary electronic device 200. As illustrated in FIG. 5, the auxiliary electronic device 200 may further comprise an auxiliary communicator 236 configured to receive a signal from the communicator 136 and/or transmit a signal thereto. In this regard, the inductive coils 132, 232 may define antennas.

Thereby, the product 100 may transmit data to or receive data from the auxiliary electronic device 200. In some embodiments the communicator 136 of the product 100 and the communicator 236 of the auxiliary electronic device 200 may be configured to communicate via one or more known wireless communication standards, such as BLUETOOTH, or Wi-Fi. In one embodiment the communicator 136 of the product 100 and the communicator 236 of the auxiliary electronic device 200 may be configured to communicate via the Near Field Communication (NFC) communication protocol. Such communications may typically occur at separation distances between the product 100 and the auxiliary electronic device 200 of about ten centimeters (3.9 inches) or less. In this regard, inductive coupling as described above may occur over relatively short distances. NFC circuits and related components (e.g., inductive coils), including related printed circuits, are available from PragmaticIC of Cambridge, United Kingdom. Such circuits may be produced via thermal nanoimprint lithography or ultraviolet nanoimprint lithograpy in some embodiments.

Various types of data may be transmitted from the product 100 to the auxiliary electronic device 200. For example, data regarding usage of the product 100 may be transferred. By way of further example, the data transferred may include the number of times the product 100 has been opened, or the remaining and/or used number of articles 110 in the package 102, which may be determined by one or more sensors that may be included in the control circuit 118B.

Conversely, various types of data may be received by the product 100, which may be transmitted thereto by the auxiliary electronic device 200. For example, the auxiliary electronic device 200 may transmit instructions for when and how to output the perceptible effect. By way of further example, in embodiments of the product 100 in which the output mechanism 122 comprises a display, the data transmitted to the product may include a message for display by the output mechanism or the data may change what is displayed in a sequence. In other embodiments the product 100 may transfer data to the auxiliary electronic device 200 indicating that the product 100 has been opened or otherwise used. The auxiliary electronic device 200 may then transfer this data to a server which may include a database of sales information. The database may be populated to reflect a sale based on the data transferred from the product 100 and/or the server may verify the sale or determine that the product was removed from the supply chain without authorization. Based on this determination, the server may transfer data to the auxiliary electronic device 200, which may then transfer data to the product 100, which may lock or unlock, or enable or disable certain features of the product. In one embodiment a message may be displayed indicating that the product 100 has been stolen when such a determination is made, or a message could thank a user for the purchase when the server determines that the product was legitimately purchased. As may be understood, various other functions may be performed depending on whether or not the server determines that the product was legitimately sold or not.

As further illustrated in FIG. 6, in addition to or alternatively to the communicator 136, in some embodiments the control circuit 118B (or any of the other control circuits disclosed herein) may comprise a controller 137 (e.g., a circuit board). As may be understood, without the controller 137, the output mechanism 122 may output the perceptible effect each time the inductive coil 132 outputs electrical current, which may occur each time the product 100 is in close proximity to the auxiliary electronic device 200 or other device including a corresponding inductive coil. Conversely, in embodiments of the product 100 including the controller 137, the controller may be configured to selectively direct the electrical current produced by the power supply to the output mechanism 122 to thereby selectively output the perceptible effect. In this regard, in some embodiments it may be preferable to output the perceptible effect only in certain instances, rather than each time the inductive circuit outputs the electrical current. Thus, in some embodiments the controller 137 may include a current storage mechanism (e.g., a battery or capacitor) and/or a switch or sensor (e.g., a proximity sensor or acceleration sensor) such that the controller may output the electrical current to the output mechanism 122 to thereby output the perceptible effect only in one or more specified circumstances, such as when a user shakes the product 100 or after a specified interval of time during which the product has remained stationary or unopened, to thereby encourage use. As may be understood, the controller 137 may be configured to selectively direct the electrical current to the output mechanism 122 in various other manners under various other circumstances.

Note that in embodiments of the control circuit 118 including the inductive coil 132, the package 102 may be configured so as to reduce interference and improve inductive coupling. In this regard, the inner wrapper 116 around the cigarettes 112 may typically comprise a metal foil material. Such metal foil may interfere with the inductive coupling between the inductive coil 132 of the control circuit 118 and the auxiliary inductive coil 232 of the auxiliary electronic device 200. Accordingly, in some embodiments the package 102 may be formed from non-metallic materials. For example, the inner wrapper 116 may comprise a paper material with a barrier liner in order to preserve freshness of the cigarettes 112. For example, in some embodiments the paper material may include a coating of atomic layer deposition (ALD) to seal the paper material from moisture. Further, the coating of ALD may be combined with a flexible layer (e.g., a flexible polymer) to resist the formation of cracks in the ALD coating. Further, in some embodiments the ALD coating and the flexible layer may be provided at various other portions of the package 102 such as at the first body portion 104 and the second body portion 106 to provide moisture barrier properties and flexibility which may optionally be used in place of the outer wrapper 130.

In some embodiments, as illustrated for example in FIGS. 4 and 6, the output mechanism 122 may be separate from the rectifier circuit 134 and configured to receive electrical current therefrom. However, in another embodiment of the control circuit 118C, the output mechanism 122 may be included in the rectifier circuit 134B, as illustrated in FIG. 7. In this regard, the rectifier circuit 134B may comprise one or more diodes configured to convert the electric current produced by the inductive coil 132 from an alternating current to a direct current. Further, in some embodiments the output mechanism 122 may comprise a light emitting diode configured to output the visible perceptible effect 128 (see, FIG. 3). Accordingly, in one embodiment in which the output mechanism 122 comprises a light emitting diode, the output mechanism may output the visible perceptible effect 128 and convert the electric current from an alternating current to a direct current by taking the place of another diode in the rectifier circuit 134B. Thus, in this embodiment the output mechanism 122 may perform two differing functions and reduce the component count of the control circuit 118, which may reduce the size and/or cost of the control circuit 118C.

As may be understood, in embodiments in which the output mechanism 122 is included in the control circuit 118, various other components may be included in the control circuit 118 as described elsewhere herein. Thus, by way of example, FIG. 8 illustrates an embodiment of the control circuit 118D wherein the output mechanism 122 is included in the rectifier circuit 134B and wherein the control circuit further comprises the communicator 136. In some embodiments the controller 137 may be further included in the control circuit 118D in addition or alternatively to the communicator 136.

In some embodiments the power supply 120 may be configured to produce the electrical current in response to movement of the package 102. In this regard, FIG. 9 schematically illustrates a partial sectional view through the package 102 including an embodiment of the power supply 120B according to an additional example embodiment of the present disclosure. In one embodiment the power supply 120B may comprise a static-electric nanogenerator (SENG). Example embodiments of SENGs are in development by Dr. Wang at Georgia Institute of Technology and by Dr. Zhou at Huazhong University of Science and Technology. In this embodiment the power supply 120B may include a plurality of films 138, 140. The films may include a first film 138 and a second film 140. The films 138, 140 may be configured to contact and release from one another.

In this regard, in the illustrated embodiment the first film 138 is coupled to the inner frame 114 and the second film 140 is coupled to the second body portion 106. As illustrated, when the second body portion 106 is positioned with respect to the first body portion 104 in the closed configuration, the first film 138 may contact the second film 140. Conversely, as may be understood, when the second body portion 106 is positioned with respect to the first body portion in the open configuration (see, e.g., FIG. 1), the first film 138 and the second film may be out of contact with one another.

FIGS. 10A and 10B schematically illustrate an embodiment of the control circuit 118E including the power supply 120B of FIG. 9. As illustrated, the first film 138 may include a pad 138A and an electrode 138B. Similarly, the second film 140 may include a pad 140A and an electrode 140B.

The films 138, 140 may define differing electronegativities. The pads 138A, 140A may comprise paper, polytetrafluoroethylene (PTFE), or polyethylene terephthalate (PET), poly-methyl methacrylate (PPMA) or KAPTON film, polyethylene, polypropylene and their copolymers, polydimethyl siloxane based polymers, polylactic acid and polyhydoxylakanoate, and regenerated cellulose polymers which may be chemically modified to charge in the manner described herein, or other electrically-insulating materials. The electrodes 138B, 140B may comprise copper, silver, or carbon, or other electrically conductive materials. In one particular example embodiment the first film 138 may comprise PET and silver as the pad 138A and the electrode 138B, respectively. Further, in one example embodiment the second film 140 may comprise PTFE and copper as the pad 140A and the electrode 140B, respectively.

A charge may be applied to one of the films 138, 140. For example, plasma may be employed to apply the charge to one of the films 138, 140. As illustrated in FIG. 10C, in one embodiment the second film 140' may further comprise a charged layer 140C, to which the charge is applied. The charged layer 140C may comprise one of the materials described above with respect to the films 138, 140.

FIG. 10A illustrates the films 138, 140 as they are brought into contact with one another. This may occur as the second body portion 106 is moved with respect to the first body portion 104 to the closed configuration (i.e., when the package 102 is closed). As the films 138, 140 are brought into contact with one another, a potential builds at the interface therebetween, at which contact between the electrode 138B of the first film 138 and the pad 140A of the second film 140 may occur. In some embodiments this potential may be temporarily stored, whereas in other embodiments the potential may be outputted as electrical current that activates the output mechanism 122 as the package 102 is closed.

FIG. 10B illustrates the films 138, 140 as they are separated from one another. This may occur as the second body portion 106 is moved with respect to the first body portion 104 to the open configuration (i.e., when the package 102 is opened). As the films 138, 140 are separated from one another, the potential is released as electrical current that may thereby power the output mechanism 122. Accordingly, in this embodiment the output mechanism 122 may output the perceptible effect each time the package 102 is opened.

Accordingly, as noted above, in some embodiments the output mechanism may output the perceptible effect when the package is opened. This may occur as a result of the power supply producing the electric current during this movement by producing static electricity. Alternatively or additionally, the control circuit may include a switch or sensor that detects the position of the second body portion with respect to the first body portion, and which directs power to the output mechanism when the second body portion reaches one or more selected positions with respect to the first body portion. For example, the switch may direct the electrical current to the output mechanism when the second body portion is moved with respect to the first body portion to the closed configuration and/or the open configuration. Accordingly, for example, in some embodiments the output mechanism may be configured to output the perceptible effect in response to movement of the second body portion relative to the first body portion from the closed configuration to the open configuration, in order to encourage access or usage of the articles included therein. As may be understood, in some embodiments the control circuit 118E may further include the above-described communicator 136 and/or the controller 137, which may perform substantially the same functions as described above.

Although example embodiments of the power supply are described above, it should be understood that various other types of power supplies may be employed in the product. For example, in other embodiments the power supply may comprise a magnetic power producer, which may include magnets configured to produce electrical current in a coil when the magnets separate. For example, the magnets may be positioned substantially as described above with respect to the films 138, 140. However, such magnetic power producers may only produce electrical current for a brief period of time, whereas a longer power generation period may be preferable.

In an additional embodiment the power supply may comprise a piezoelectric power producer. However, piezoelectric devices may be relatively expensive and/or require a relatively large tap or other such user interaction to produce the electrical current required for operation of the output mechanism.

In a further embodiment the power supply may comprise a triboelectric power producer. Triboelectric power producers produce electrical current from static electricity via rubbing of materials together in frictive contact. Thus, for example, a triobelectric power producer may include first and second portions that are positioned substantially as described above with respect to the films 138, 140. Thereby, for example, the first and second portions of the triboelectric power producer may rub against one another during opening and closing of the package.

In another embodiment the power supply 120 may employ capacitive coupling to produce the electrical current. In capacitive coupling, which may also be referred to as electrostatic induction, power is transmitted by electric fields between electrodes such as metal plates. The pair of electrodes form a capacitor, with the intervening space serving as the dielectric. Thereby, when electrical current is provided to the plate at an auxiliary electronic device as an alternating current, the oscillating electric field induces an alternating potential on the plate at the product by electrostatic induction, which may be converted to a direct current via usage of a rectifying circuit.

In other embodiments the power supply 120 may employ a far-field power transmission mechanism. For example far-field energy transmission techniques may include microwave power transmission and laser power transmission. Although these techniques may be employed to transmit electrical power wirelessly, such techniques may require usage of specialized antennas and other mechanisms which may undesirably increase the cost and/or size of the product.

In some embodiments the product 100 may be displayed in a product display system as disclosed in U.S. patent application Ser. No. 14/725,725, filed May 29, 2015, to Rogers, which is incorporated herein by reference in its entirety. Thereby, for example, the output mechanism 122 may be activated while received in the product display in additional to, or alternatively to, the other instances in which the output mechanism is activated as described elsewhere herein.

A related method for assembling a product is also provided. As illustrated in FIG. 11 the method may include providing a package at operation 302. The package may include a power producer configured to produce an electrical current and an output mechanism configured to receive the electrical current from the power producer and output a perceptible effect. Further, the method may include inserting one or more tobacco-containing articles into the package at operation 304.

In some embodiments providing the package at operation 302 may include providing a first body portion defining an opening and a second body portion moveable with respect to the first body portion between a closed configuration in which the first body portion substantially closes the opening and an open configuration. Inserting one or more tobacco-containing articles into the package at operation 304 may include inserting the one or more tobacco-containing articles into the first body portion.

In some embodiments the power producer may comprise an inductive coil. The output mechanism may include a light emitting diode. The light emitting diode may be included in a rectifier circuit configured to convert the electric current from an alternating current to a direct current. Providing the package may include electrically coupling a communicator to the inductive coil. The communicator may be configured to communicate with an auxiliary electronic device. Further, the method may include wrapping the one or more tobacco-containing articles with an inner wrapper comprising a paper material.

In some embodiments the power producer may include a plurality of films. Movement between the films may produce the electrical current. The output mechanism may comprise a light emitting diode, an electronic ink, a liquid crystal display, or an electrochromic display. The package may include a logo and the output mechanism may be positioned at the logo.

Many modifications and other aspects of the disclosure set forth herein will come to mind to one skilled in the art to which the disclosure pertains having the benefit of the teachings presented in the foregoing descriptions and the associated drawings. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. A product, comprising:
    a package, comprising:
        a power producer comprising a plurality of films, and wherein movement between the films is configured to produce an electrical current; and
        an output mechanism configured to receive the electrical current from the power producer and output a perceptible effect; and
    one or more tobacco-containing articles received in the package.

2. The product of claim 1, wherein the package further comprises a first body portion defining an opening and a second body portion moveable with respect to the first body portion between a closed configuration in which the first body portion substantially closes the opening and an open configuration,
    wherein the one or more tobacco-containing articles are received in the first body portion and accessible via the opening in the open configuration.

3. The product of claim 2, wherein the output mechanism is configured to output the perceptible effect in response to movement of the second body portion relative to the first body portion.

4. The product of claim 1, wherein the output mechanism is selected from a group consisting of a light emitting diode, an electronic ink, a liquid crystal display, an electroluminescent material, a light emitting electrochemical cell, and an electrochromic display.

5. The product of claim 1, wherein the package comprises a logo, and
    wherein the output mechanism is positioned at the logo.

6. The product of claim 1, wherein the output mechanism comprises an electrochromic display, the electrochromic display being configured to change color or shade in a pattern.

7. The product of claim 2, wherein the plurality of films comprises a first film and a second film, wherein the movement between the films comprises the first film and the second film being configured to contact and release from one another to produce the electrical current.

8. The product of claim 7, wherein the package comprises an inner frame configured to provide the package with additional support, the first film being coupled to the inner frame and the second film being coupled to the second body portion, such that in the closed configuration the first film contacts the second film and in the open configuration the first film releases from the second film to produce the electrical current.

9. The product of claim 7, wherein one of the first film and the second film is charged.

10. The product of claim 1, wherein the plurality of films comprises a first film and a second film, wherein the movement between the films comprises the first film and the second film being configured to contact and release from one another to produce the electrical current.

11. A method for assembling a product, comprising:
    providing a package, comprising:
        a power producer comprising a plurality of films, and wherein movement between the films is configured to produce an electrical current; and
        an output mechanism configured to receive the electrical current from the power producer and output a perceptible effect; and
    inserting one or more tobacco-containing articles into the package.

12. The method of claim 11, wherein providing the package comprises providing a first body portion defining an opening and a second body portion moveable with respect to the first body portion between a closed configuration in which the first body portion substantially closes the opening and an open configuration, and
    wherein inserting one or more tobacco-containing articles into the package comprises inserting the one or more tobacco-containing articles into the first body portion.

13. The method of claim 11, wherein the output mechanism comprises a light emitting diode, an electronic ink, a liquid crystal display, or an electrochromic display.

14. The method of claim 11, wherein the package comprises a logo and the output mechanism is positioned at the logo.

15. The method of claim 12, wherein the plurality of films comprises a first film and a second film, wherein the movement between the films comprises the first film and the second film being configured to contact and release from one another to produce the electrical current.

16. The method of claim 15, wherein providing the package comprises providing an inner frame configured to provide the package with additional support, the first film being coupled to the inner frame and the second film being coupled to the second body portion, such that in the closed configuration the first film contacts the second film and in the open configuration the first film releases from the second film to produce the electrical current.

17. The method of claim 15, wherein one of the first film and the second film is charged.

18. The method of claim 11, wherein the plurality of films comprises a first film and a second film, wherein the movement between the films comprises the first film and the second film being configured to contact and release from one another to produce the electrical current.

\* \* \* \* \*